(12) United States Patent
Hufnagel

(10) Patent No.: US 9,317,146 B1
(45) Date of Patent: Apr. 19, 2016

(54) HAPTIC TOUCH FEEDBACK DISPLAYS HAVING DOUBLE BEZEL DESIGN

(75) Inventor: Bruce David Hufnagel, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 250 days.

(21) Appl. No.: 13/593,283

(22) Filed: Aug. 23, 2012

(51) Int. Cl.
*G06F 3/041* (2006.01)
*G06F 3/033* (2013.01)
*G09G 5/00* (2006.01)

(52) U.S. Cl.
CPC .............. *G06F 3/041* (2013.01); *G06F 3/033* (2013.01); *G09G 5/00* (2013.01); *G09G 2380/10* (2013.01)

(58) Field of Classification Search
CPC ............... G06F 3/041–3/047; G06F 3/033; G08B 6/00; G09B 21/003; G09G 5/00; G09G 2380/10
USPC ............... 345/156–184; 178/18.01–18.11; 340/407.1
See application file for complete search history.

(56) References Cited

U.S. PATENT DOCUMENTS

| | | | |
|---|---|---|---|
| 6,031,524 A * | 2/2000 | Kunert | 345/173 |
| 6,118,435 A * | 9/2000 | Fujita et al. | 345/173 |
| 6,429,846 B2 * | 8/2002 | Rosenberg et al. | 345/156 |
| 7,148,875 B2 * | 12/2006 | Rosenberg et al. | 345/173 |
| 7,215,329 B2 * | 5/2007 | Yoshikawa et al. | 345/173 |
| 7,245,048 B2 * | 7/2007 | Fujii et al. | 310/12.01 |
| 7,336,260 B2 * | 2/2008 | Martin et al. | 345/169 |
| 7,436,396 B2 * | 10/2008 | Akieda et al. | 345/173 |
| 7,656,393 B2 | 2/2010 | King et al. | |
| 7,834,857 B2 * | 11/2010 | Prados | 345/173 |
| 8,026,902 B2 * | 9/2011 | Medler et al. | 345/173 |
| 8,059,104 B2 | 11/2011 | Shahoian et al. | |
| 8,059,105 B2 * | 11/2011 | Rosenberg et al. | 345/173 |
| 8,063,892 B2 | 11/2011 | Shahoian et al. | |
| 8,063,893 B2 * | 11/2011 | Rosenberg et al. | 345/173 |
| 8,188,981 B2 * | 5/2012 | Shahoian et al. | 345/173 |
| 8,260,377 B2 * | 9/2012 | Paleczny et al. | 455/575.1 |
| 8,508,927 B2 * | 8/2013 | Chen | 361/679.3 |
| 8,531,829 B2 * | 9/2013 | Oberpriller et al. | 361/679.41 |
| 8,619,044 B2 * | 12/2013 | Pertuit et al. | 345/173 |
| 8,692,815 B2 * | 4/2014 | Deslippe et al. | 345/179 |
| 2002/0033795 A1 * | 3/2002 | Shahoian et al. | 345/156 |
| 2002/0126102 A1 * | 9/2002 | Redmayne | 345/173 |
| 2002/0149561 A1 * | 10/2002 | Fukumoto et al. | 345/156 |
| 2003/0025367 A1 * | 2/2003 | Boudinot | 297/217.3 |
| 2003/0067449 A1 * | 4/2003 | Yoshikawa et al. | 345/173 |
| 2005/0038944 A1 * | 2/2005 | Harada et al. | 710/110 |
| 2005/0052430 A1 * | 3/2005 | Shahoian et al. | 345/173 |
| 2005/0225539 A1 * | 10/2005 | Prados | 345/173 |
| 2005/0231313 A1 * | 10/2005 | Shahoian | 335/220 |
| 2005/0253643 A1 * | 11/2005 | Inokawa et al. | 327/517 |
| 2006/0054335 A1 * | 3/2006 | Rapp et al. | 174/48 |
| 2006/0232915 A1 * | 10/2006 | Chou et al. | 361/681 |
| 2006/0256075 A1 * | 11/2006 | Anastas et al. | 345/156 |
| 2007/0035526 A1 * | 2/2007 | Takenaka et al. | 345/173 |

(Continued)

*Primary Examiner* — Dmitriy Bolotin
(74) *Attorney, Agent, or Firm* — Donna P. Suchy; Daniel M. Barbieri

(57) ABSTRACT

A display assembly includes a frame assembly, a display module having a display housing and a touch screen display disposed at least partially within the display housing such that the display module and touch screen display form an environmentally sealed exterior, and an actuator assembly. The display module is coupled to the frame assembly via the actuator assembly such that the display module is configured to provide haptic feedback to users via the touch screen display based on operation of the actuator assembly.

18 Claims, 3 Drawing Sheets

(56) References Cited

U.S. PATENT DOCUMENTS

| | | | |
|---|---|---|---|
| 2008/0055277 A1* | 3/2008 | Takenaka et al. | 345/177 |
| 2009/0086420 A1* | 4/2009 | Stockham et al. | 361/679.26 |
| 2009/0174672 A1* | 7/2009 | Schmidt | 345/173 |
| 2010/0285850 A1* | 11/2010 | Paleczny et al. | 455/575.1 |
| 2011/0037706 A1* | 2/2011 | Pasquero et al. | 345/173 |
| 2011/0128239 A1* | 6/2011 | Polyakov et al. | 345/173 |
| 2012/0126959 A1* | 5/2012 | Zarrabi et al. | 340/407.1 |
| 2012/0212466 A1* | 8/2012 | Kohtoku | 345/207 |
| 2013/0044049 A1* | 2/2013 | Biggs et al. | 345/156 |
| 2013/0044058 A1* | 2/2013 | Sciulli et al. | 345/168 |
| 2013/0044075 A1* | 2/2013 | Utsugi et al. | 345/174 |
| 2013/0207793 A1* | 8/2013 | Weaber et al. | 340/407.2 |

\* cited by examiner

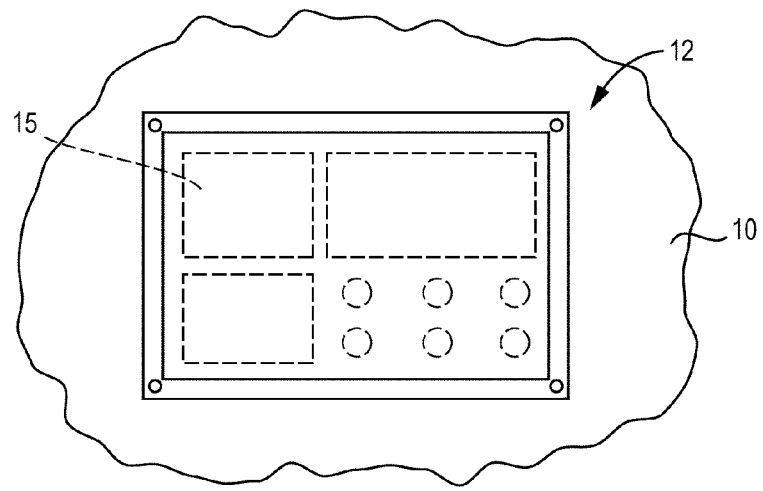
FIG. 1
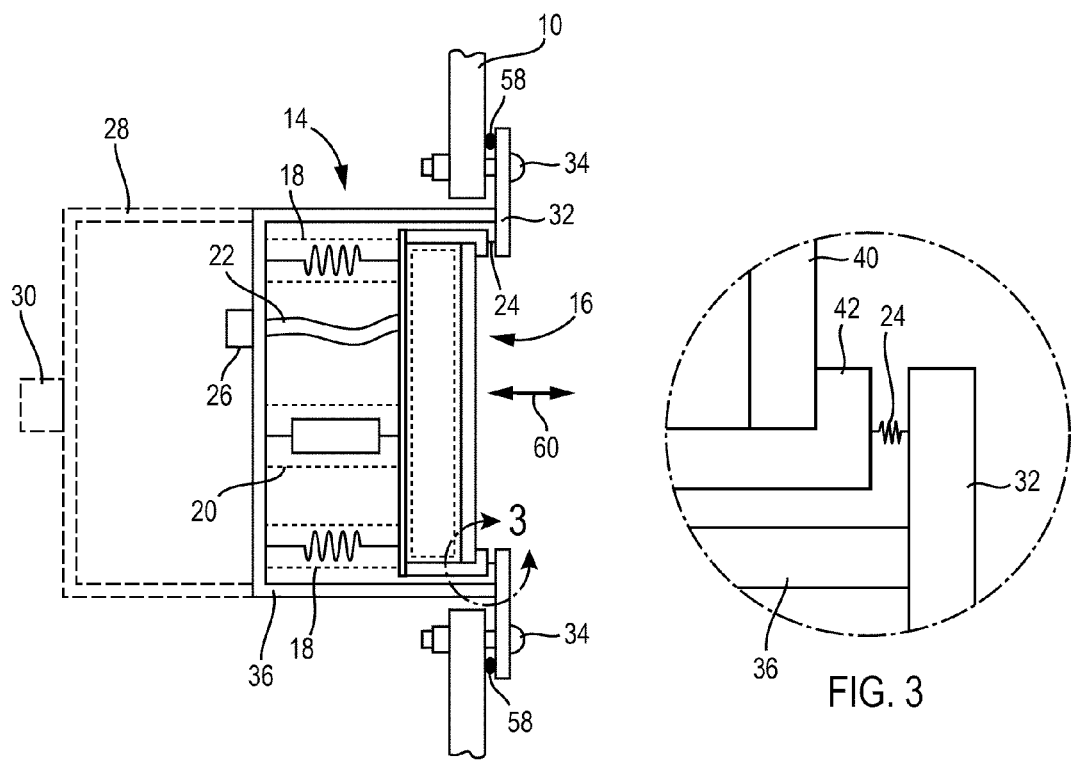
FIG. 2
FIG. 3

HAPTIC TOUCH FEEDBACK DISPLAYS HAVING DOUBLE BEZEL DESIGN

BACKGROUND

The present disclosure relates generally to the field of displays that provide haptic touch feed back to users, and more specifically, to displays that provide haptic feedback to users and utilize a double bezel design.

Haptic feedback involves providing tactile feedback to user by applying force(s), vibrations, etc. to the user, thereby engaging the user's sense of touch. There are many challenges with providing displays such as liquid crystal and other displays in combination with haptic feedback, particularly in environments requiring environmental and/or other specialized sealing of components.

As such, various embodiments disclosed herein relate to display assemblies that use a double bezel design to provide haptic feedback in environments requiring sealing of components.

SUMMARY

One embodiment relates to a display assembly comprising a frame assembly; a display module comprising a display housing and a touch screen display disposed at least partially within the display housing such that the display module and touch screen display form an environmentally sealed exterior; and an actuator assembly, wherein the display module is coupled to the frame assembly via the actuator assembly such that the display module is configured to provide haptic feedback to users via the touch screen display based on operation of the actuator assembly.

Another embodiment relates to a display assembly comprising a frame assembly comprising a frame bezel coupled to a frame housing, the frame bezel and the frame housing defining an interior; a display module comprising a display housing and a touch screen display disposed at least partially within the display housing, the display housing provided within the interior such that a front portion of the display module is coupled to the frame bezel and a rear portion of the display module is coupled to the frame assembly; and an actuator assembly disposed within the interior and configured to cause the display module to move relative to the frame assembly.

Another embodiment relates to a display assembly configured to be mounted to a relatively planar panel, the display assembly comprising a frame assembly comprising a frame bezel coupled to a frame housing, the frame bezel and the frame housing defining an interior; a display module moveably coupled to the frame assembly and positioned within the interior, the display module comprising a display and a display housing having a display bezel coupled to the display; wherein the display is configured to remain fixed relative to the display bezel when the display module moves relative to the frame assembly.

BRIEF DESCRIPTION

FIG. 1 is front view of a display assembly secured to an instrument control panel according to an exemplary embodiment.

FIG. 2 is a cross-sectional view of the display assembly of FIG. 1 according to an exemplary embodiment.

FIG. 3 is a detailed view of a portion of FIG. 1 according to an exemplary embodiment.

DETAILED DESCRIPTION OF EXEMPLARY EMBODIMENTS

Prior to discussing the various FIGURES illustrated herein, it should be noted that various embodiments disclosed herein relate to display assemblies that provide haptic feedback to users. Haptic feedback may include various types of feedback (e.g., tactile feedback, force feedback, etc.) that a user may sense through touching a touch screen display, including movement of the display (e.g., a vibration, buzz, etc) deformation of the display (e.g., to form irregularities in the surface of the display), etc. Such display assemblies may be used in a variety of applications, including within vehicle control areas such as a cockpit of an aircraft, etc. In some embodiments, various components may be environmentally sealed to avoid exposure to undesired materials such as dirt, water, an/or other pollutants, etc.

In various embodiments, certain components are configured to form a "seal," be sealed together, or the like. As used herein, the term "seal" includes, but is not limited to, a separation, barrier, etc. that reduces the ability of moisture, debris, air, and/or other materials to travel from one area to another area. The seals may not be absolute in preventing the passage of such materials between different areas, but rather may substantially reduce the passage of such materials. Furthermore, the seals may be selectively configured to provide a seal or barrier against particular materials (e.g., water, air, debris, etc.) rather than others.

Referring to the FIGURES generally, a display assembly includes a housing that forms an environmentally sealed cavity, and an environmentally sealed display head module (DHM) that resides within the cavity. A rear electronics interface module (REIM) may be coupled to or included within the housing and may be similarly sealed. One or more environmentally sealed mechanical supports and/or actuators couple the display module in the housing, providing mechanical support for the display module and the electromotive force for providing haptic feedback. These sealed "sub-systems" may be designed to meet structural and/or environmental regulations required for, e.g., aircraft certification, etc.

Referring now to FIG. 1, a display assembly 12 is shown according to an exemplary embodiment coupled to a control panel 10 (e.g., an aircraft instrument control panel, etc.). In one embodiment, display assembly 12 is a cockpit control device usable by, for example, a pilot of an aircraft. Control panel 10 may be a generally planar panel member (e.g., made of steel, aluminum, composite materials, etc.) and together with display assembly 12 may form one or more environmentally sealed portions (e.g., surfaces, cavities, etc.). Display assembly 12 provides a graphical and tactile user interface for users that may include a touch screen display and be configured to provide various "buttons" (e.g., graphically displayed buttons, etc.) or other input features, and to provide haptic feedback to users.

Figure 4:
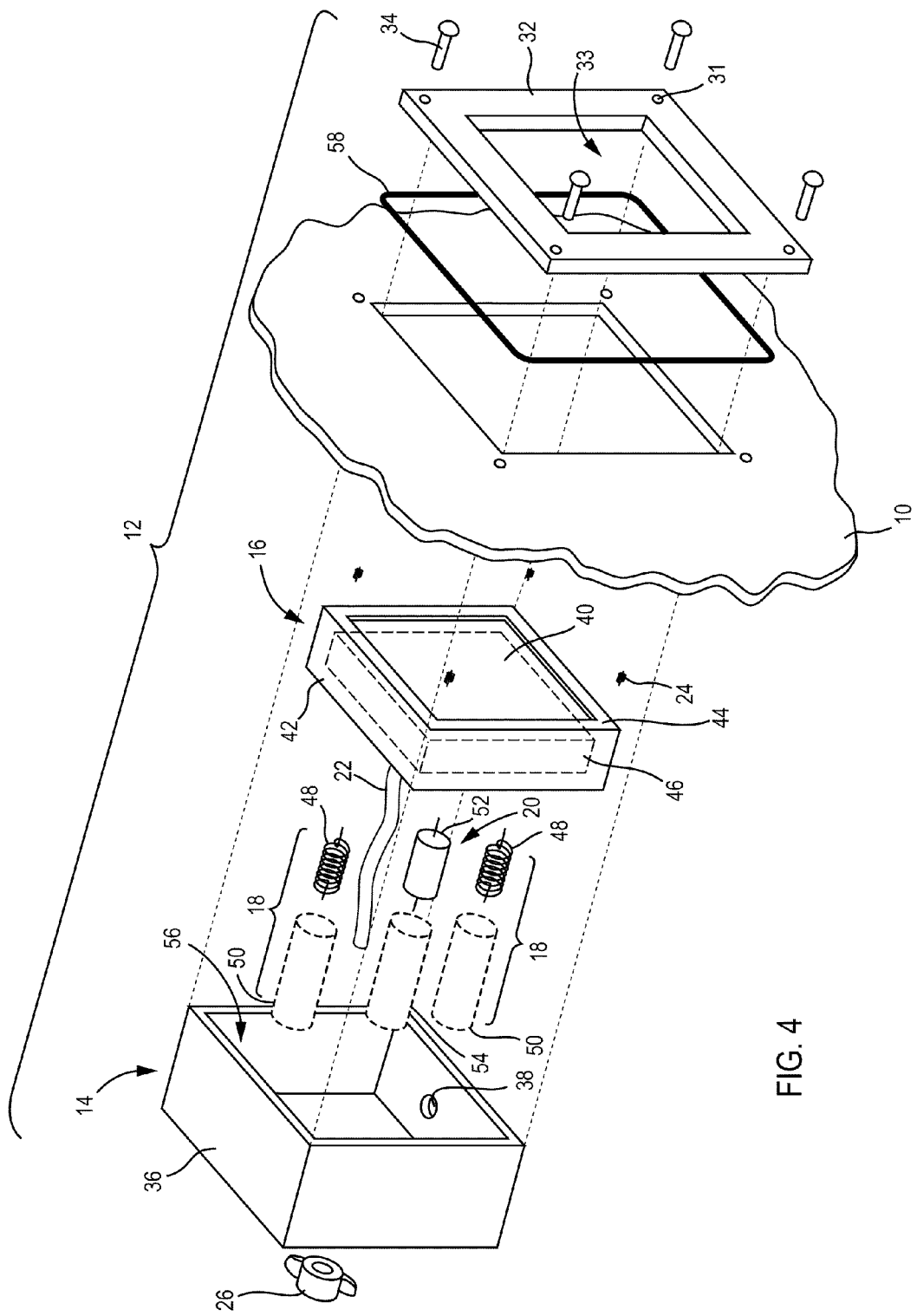
FIG. 4 is an exploded view of the display assembly of FIG. 1 according to an exemplary embodiment.

Referring to FIGS. 2-4, display assembly 12 is shown in greater detail according to an exemplary embodiment. As shown in FIGS. 2-4, display assembly 12 includes a display module 16 which is coupled to and positioned at least partially within a frame assembly 14. Display module 16 may be coupled to frame assembly via one or more spring assembly 18, actuator assembly 20, wires 22, compliant members 24, and/or other suitable mechanisms, devices, etc. In one embodiment, frame assembly 14 is secured to panel 10 in a fixed fashion (e.g., via bolts, screws, rivets, adhesives, seals, etc.) to minimize movement and create an environmental seal between frame assembly 14 and panel 10. Display module 16 is in turn coupled to frame assembly 14 in a moveable fashion (e.g., to permit display module 16 to provide haptic feedback to users).

According to an exemplary embodiment, frame assembly 14 includes a frame bezel 32 (e.g., a cover plate, etc.), a frame housing 36, and one or more fasteners 34. Frame housing 36 is coupled to frame bezel 32 to define an interior 56. One or more fasteners 34 may extend through all or a portion of frame bezel 32 and be usable to secure frame bezel 32, and therefore display assembly 12, to panel 10 or another suitable support.

As shown in FIG. 4, according to an exemplary embodiment, frame bezel 32 may be a generally planar member defining an aperture 33 therethrough to permit viewing of a display, access to buttons, etc., by a pilot or other user. While frame bezel 32 is generally shown to have a rectangular peripheral shape and a rectangular aperture, other shapes and/or sizes (e.g., square, oval, irregular, etc.) may be utilized according to various alternative embodiments. Frame bezel 32 may be made of any suitable material, such as a metal (e.g., steel, aluminum, etc.), a polymer, a composite, etc. In one embodiment, frame bezel 32 is a stainless steel member that may be painted or otherwise provided with a decorative and/or protective coating. Frame bezel 32 may further include one or more fastener apertures 31 through which fasteners such as fasteners 34 may extend.

According to an exemplary embodiment, frame housing 36 includes one or more sidewalls that form a portion of interior 56. In some embodiments, frame housing 36 forms a rectangular and/or square-like "box" having one open side, while in other embodiments, frame housing 36 may take other shapes. In one embodiment, the inner surfaces of frame housing 36 form an environmentally sealed interior (e.g., to define an environmentally sealed cavity). In further embodiments, a vent or other aperture 38 may be provided in a sidewall of frame housing 36 to permit debris, etc. to leave interior 56. In yet further embodiments, aperture 38 may be selectively closeable and/or sealable to enable the maintenance of an environmentally sealed interior.

According to one embodiment, frame housing 36 may be further configured to receive one or more connectors 26 so as to provide electrical interconnectivity between display module 16 and other electrical components. Connector 26 may be coupled to frame housing 36 in an environmentally sealed manner using appropriate sealed connectors, gaskets, seals, etc.

It should be noted that while frame housing 36 and frame bezel 32 are shown in FIG. 4 as two separate components, according to various alternative embodiments, one or more portions of frame housing 36 and frame bezel 42 may be formed integrally as a unitary component. Furthermore, any separate components may be coupled using any suitable methods, including welding, adhesives, mechanical fasteners, etc. As shown in FIGS. 2 and 4, frame bezel 32 may extend around and beyond the periphery of frame housing 36 to provide a mounting surface with which to utilize fasteners 34 to couple frame assembly 14 to panel 10.

Referring further to FIGS. 2 and 4, according to an exemplary embodiment, one or more seals 58 may be positioned between frame bezel 32 and panel 10 to provide an environmentally sealed interface. Seal 58 may include a compressible seal such as a gasket, foam material, etc. suitable for maintaining a sealed interface, or joint, between frame bezel 32 and panel 10. As shown in FIG. 4, seal 58 may extend entirely around aperture 33 in frame bezel 32 to ensure a complete seal.

According to an exemplary embodiment, display module 16 includes a display 40, a display housing 42 having a display bezel 44, and display electronics 46. In one embodiment, display 40 is a liquid crystal display (LCD). In other embodiments, display 40 may be any of a number of other types of displays, including a light emitting diode (LED) display, an organic LED (OLED) display, etc. Display 40 may further include a touch screen interface, permitting users to provide inputs to and receive haptic feedback from display 40 via the touchscreen. Display 40 may include and/or be coupled to display electronics 42, and may communicate with other remote components via display electronics 42. Display electronics may include a processor, a memory, and/or other electronic components.

Display housing 42 includes a display bezel 44, which may be a separate component from or integrally formed with the remainder of display housing 42. Display housing 42 and display 40 cooperate to provide an environmentally sealed display module that houses display electronics 46 and/or other components. For example, display module 16 may be environmentally sealed such that some or all portions of the exterior of display module 16 are sealed against migration of debris, moisture/water/fluid, or combinations thereof, etc. In one embodiment, display bezel 44 extends around the edge of the front surface of display 40 to form a sealed interface between display housing 42 and display 40. In one embodiment, display bezel 44 and display 40 are joined so as to prevent relative movement between display bezel 44 and display 40, thereby avoiding potential degradation of the seal between the components that may otherwise occur should there be relative movement between the components. Display bezel 44 and display 40 may be coupled using any suitable adhesives, laminations, etc.

Referring now to FIGS. 2-4, according to an exemplary embodiment, display module 16 is moveably positioned within cavity 56 formed by frame assembly 14. In one embodiment, display module 16 may be coupled to frame assembly 14 via one or more spring assembly 18, actuator assembly 20, wires 22, compliant members 24, and/or other suitable mechanisms, devices, etc. For example, one or more spring assemblies 18 may be used to couple display housing 42 to frame housing 36 and guide display housing 42 such that display module 16 is moveable relative to frame assembly 14, but tends to return to a "rest" position when not otherwise acted upon by outside forces.

According to an exemplary embodiment, spring assembly 18 includes a spring member 48 and a spring sealing member 50. Spring member 48 provides a spring force that acts between frame housing 36 and display housing 42, and spring sealing member 50 encloses spring member 48 and provides sealed interfaces with both display module 16 (e.g., via display housing 42) and frame assembly 14 (e.g., via frame housing 36). Spring member 48 may be or include any suitable spring device, including a coil spring, a leaf spring, a compliant/compressible material (e.g., a compliant and/or compressible polymer, foam, gasket, etc.), or another suitable device or material. Spring sealing member 50 may be a sealing material suitable for providing an environmental seal that extends between display module 16 and frame assembly 14 and encloses spring member 48. Any suitable number of spring assemblies 18 may be used according to various exemplary embodiments, and the positioning, spacing, etc., of spring assemblies 18 may be varied to suit a particular application.

According to an exemplary embodiment, actuator assembly 20 is provided between display module 16 and frame assembly 14 and is configured to move display module 16 relative to frame assembly 14 when actuated. Actuator assembly 20 includes an actuator 52 and an actuator sealing member 54. Actuator 52 may be any of a variety of devices usable to impart movement to display module 16. According to one embodiment, actuator 52 is or includes an electromechanical solenoid having an armature that moves linearly (e.g., along line 60 shown in FIG. 2) to cause a corresponding movement (e.g., vibration, displacement, etc.) in display module 16. According to various other embodiments, other types of solenoids or other actuators may be used in connection with actuator assembly 20. Actuator sealing member 50 may be a sealing material suitable for providing an environmental seal that extends between display module 16 and frame assembly 14 and encloses actuator 52. Any suitable number of actuator assemblies 20 may be used according to various exemplary embodiments, and the positioning, spacing, etc., of the actuator assemblies 20 may be varied to suit a particular application.

In some embodiments, actuator assembly 20 is configured to move display module 16 in a generally linear fashion (e.g., back and forth along line 60 shown in FIG. 2). For example, as shown in FIG. 2, display module 16 may move generally toward/away from the user (e.g., in a direction perpendicular to the front surfaces of frame bezel 32 and display bezel 44). According to various other embodiments, actuator assembly 20 may be configured to move display module 16 in other fashions, e.g., non-linear (e.g., circular, elliptical, etc.), and in other directions (e.g., perpendicular to arrow 60 shown in FIG. 2 (e.g., in an up and down fashion relative to the user, in a left/right fashion relative to the user, etc.). As such, the position/number and/or type of actuator assembly 20 may be varied to provide the appropriate and/or desired movement of display module 16. Further, different types of actuators may be used in connection with display assembly 12 to provide differing types of movement.

According to an exemplary embodiment, wires 22 (e.g., cables, etc.) provide an electrical interface between display module 16 and connector 26, which in turn provides an interface between display assembly 12 and other local and/or remote electronics components. In some embodiments, an optional rear electronics interface module (REIM), shown as interface module 28, may be mechanically and/or electrically coupled to and/or form a part of display assembly 12. For example, interface module 28 may include computing electronics and a connector 30 configured to interface with connector 26 such that interface module 28 can communicate with display module 16. In one embodiment, interface module 28 may have a sealed housing, while in other embodiments, interface module 28 may be vented using apertures, slits, etc. Further, while interface module 28 is shown in FIG. 2 as being coupled to frame housing 36, in other embodiments, interface module 28 may be located remotely from frame housing 36, and therefore, display assembly 12.

Referring to FIG. 3, compliant member 24 provides a compliant, or resilient, interface between display bezel 42 and frame bezel 32. Compliant member 24 may include any of a number of components, including various gaskets, seals, etc., that permit relative motion between the display bezel and the frame bezels. Providing relative motion between the display and frame bezels, as shown in FIG. 3, rather than between a bezel and a touchscreen display, as in many conventional devices, avoids degradation of the bezel-display interface that may otherwise occur when using a display screen such as a touch screen display that provides haptic feedback and therefore typically moves in one or more directions during use.

Figure 5:
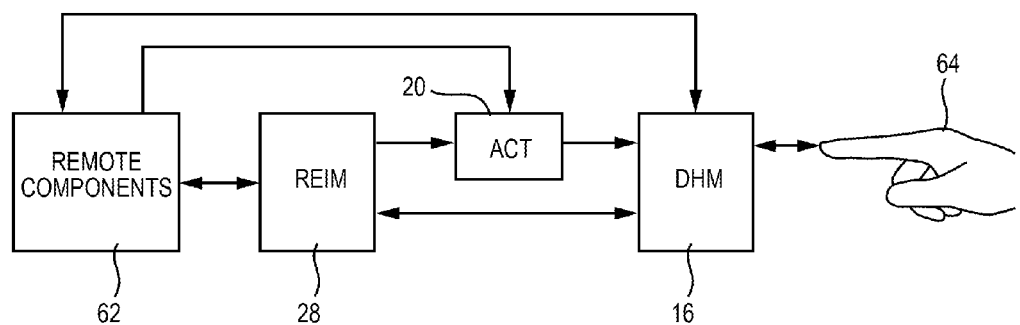
FIG. 5 is a schematic block diagram of various components of the display assembly of FIG. 1 according to an exemplary embodiment.

Referring to FIG. 5, a schematic representation of various electrical and user interfaces that may be used in connection with display assembly 12 is shown according to an exemplary embodiment. As shown in FIG. 5, a user 64 can provide inputs to, and receive outputs from (e.g., in the form of haptic feedback), display module 16 via, e.g., display 40 and display electronics 46. Movement of display module 16 is provided by movement of actuator assembly 20 (e.g., a solenoid, etc.) which may be controlled via interface module 28 and/or remote electronics components 62. Display module 16 may also communicate directly with remote components 62, which may include aircraft acceleration sensors and other devices (e.g., to take into account aircraft—induced movement of the display, etc.). It should be noted that other means and/or paths of communication between the various components are possible, and components may be integrated together and/or separated into sub-components relative to the component configuration shown in FIG. 5 according to various exemplary embodiments.

The display assembly disclosed in the various embodiments herein may provide various benefits over more traditional display and/or control assemblies, particularly in the context of aircraft instrument control panels and similar applications. For example, touch-interactive displays such as those disclosed herein may reduce the number of physical buttons, knobs, etc. often present on, e.g., a typical aircraft instrument control panel. Furthermore, because the display bezel is generally fixed and sealed relative to the display, degradation of the bezel-display interface due to relative movement of the components is minimized. Further yet, by providing various components of the display assembly as environmentally sealed components, various structural and/or environmental regulations may be satisfied while improving the "ruggedness" of the display assembly.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components.

It is important to note that the construction and arrangement of the elements of the display assembly as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. A display assembly comprising:
   a frame assembly;
   a display module comprising a display housing, computing electronics, and a touch screen display disposed at least partially within the display housing such that the display module and touch screen display form an environmentally sealed exterior, wherein the touchscreen display includes a touchscreen interface and at least one of an LCD display and an LED display, and wherein the computing electronics include a processor and memory;
   an actuator assembly, wherein the display housing is coupled to the frame assembly via the actuator assembly such that the actuator is configured to move the display module, including the display housing, the computing electronics, the touchscreen interface, and the at least one of an LCD display and an LED display, relative to the frame assembly, and further such that the display module is configured to provide haptic feedback to users via the touch screen display based on operation of the actuator assembly;
   wherein the display housing comprises a rear portion and a front portion, the front portion having a display bezel extending over at least a portion of a front surface of the display, wherein the rear portion of the display housing is coupled to the frame assembly via the actuator assembly and the display bezel is coupled to the frame assembly via at least one compliant member.

2. The display assembly of claim 1, wherein the frame assembly comprises a frame housing coupled to a frame bezel, the frame bezel configured to be environmentally sealed to a generally planar panel such that the planar panel and the frame assembly form an environmentally sealed assembly.

3. The display assembly of claim 1, wherein the actuator assembly is configured to operate based on receiving inputs from computing electronics located remote from the display module.

4. The display assembly of claim 1, wherein the actuator assembly comprises an actuator and an actuator sealing member, the actuator sealing member configured to provide a seal between the frame housing and the display housing and enclose the actuator.

5. The display assembly of claim 4, wherein the actuator comprises a solenoid.

6. The display assembly of claim 1, further comprising at least one spring assembly configured to further couple the frame assembly to the display module.

7. The display assembly of claim 6, wherein the spring assembly comprises a spring member and a spring sealing member, the spring sealing member configured to provide a seal between the frame housing and the display housing and enclose the spring member.

8. The display assembly of claim 1, wherein the actuator assembly is configured to cause the display module to move in a vibrating fashion.

9. A display assembly comprising:
   a frame assembly comprising a frame bezel coupled to a frame housing, the frame bezel and the frame housing defining an interior;
   a display module comprising a display housing, computing electronics, and a touch screen display disposed at least partially within the display housing, the computing electronics including a processor and memory, the display housing provided within the interior such that a front portion of the display module is coupled to the frame bezel and a rear portion of the display module is coupled to the frame assembly, wherein the touchscreen display includes a touchscreen interface and at least one of an LCD display and an LED display; and
   an actuator assembly disposed within the interior and configured to cause the display module, including the computing electronics, touchscreen interface and the at least one of the LCD display and the LED display, to move relative to the frame assembly;
   wherein a rear portion of the display housing is coupled to the frame assembly via the actuator assembly.

10. The display assembly of claim 9, wherein the frame bezel and the frame housing form an environmentally sealed interior surface defining the interior, and wherein the display housing and the touch screen display form an environmentally sealed display module.

11. The display assembly of claim 9, wherein the actuator assembly comprises an actuator disposed within an actuator sealing member extending between the frame assembly and the display module.

12. The display assembly of claim 9, wherein the frame assembly comprises a frame bezel that is configured to be removeably coupled to and environmentally sealed with a relatively planar panel member.

13. The display assembly of claim 12, wherein a front surface of the display bezel is coupled to a rear surface of the frame bezel via a compliant member.

14. The display assembly of claim 9, wherein the actuator assembly is configured to cause the display module to move in a vibrating fashion relative to the frame assembly.

15. A display assembly configured to be mounted to a relatively planar panel, the display assembly comprising:
   a frame assembly comprising a frame bezel coupled to a frame housing, the frame bezel and the frame housing defining an interior;
   a display module moveably coupled to the frame assembly and positioned within the interior, the display module comprising a display, a touchscreen interface, computing electronics, and a display housing having a display bezel coupled to the display, wherein the computing electronics include a processor and memory;
   wherein the display is configured to remain fixed relative to the display bezel when the display module, including the display, the touchscreen interface, the computing electronics, and the display housing, moves relative to the frame assembly;
   wherein a rear portion of the display housing is coupled to the frame assembly via an actuator assembly.

16. The display assembly of claim 15, wherein the actuator assembly is configured to cause the display module to move relative to the frame assembly.

17. The display assembly of claim 15, wherein the display bezel is coupled to the frame bezel via a compliant member.

18. The display assembly of claim 15, further comprising at least one spring assembly extending between the frame housing and a rear portion of the display housing.

* * * * *